(12) United States Patent
Mahadik et al.

(10) Patent No.: US 9,172,715 B2
(45) Date of Patent: Oct. 27, 2015

(54) STEALTH NETWORK ATTACK MONITORING

(71) Applicant: McAfee, Inc., Santa Clara, CA (US)

(72) Inventors: Vinay Mahadik, Milpitas, CA (US);
Bharath Madhusudan, Sunnyvale, CA (US); Shivakumar Buruganahalli, San Jose, CA (US); Venu Vissamsetty, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/060,062

(22) Filed: Oct. 22, 2013

(65) Prior Publication Data

US 2014/0047547 A1    Feb. 13, 2014

Related U.S. Application Data

(63) Continuation of application No. 13/095,525, filed on Apr. 27, 2011, now abandoned.

(51) Int. Cl.
*G06F 11/00* (2006.01)
*H04L 29/06* (2006.01)

(52) U.S. Cl.
CPC ........ *H04L 63/1433* (2013.01); *H04L 63/1408* (2013.01)

(58) Field of Classification Search
CPC ............ H04L 63/1408; H04L 63/1433; H04L 63/145; H04L 63/083; H04L 63/1416; H04L 45/00; H04L 45/22; H04L 45/28; H04L 65/80; H04L 65/1083; H04L 67/104; H04L 67/1085; H04L 67/322; H04L 43/0817; H04L 43/10; H04L 63/061; H04L 65/1003; H04L 65/1069; G06F 21/566; G06F 21/55; G06F 21/552; G06F 11/0709; G06F 11/0793; G06F 11/00

USPC ............ 726/22–27; 714/4.1, 26, 43; 379/112.04, 221.03, 279; 709/223–225; 370/225

See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,159,149 B2 * | 1/2007 | Spiegel et al. | 714/43 |
| 7,506,155 B1 | 3/2009 | Stewart et al. | |
| 2004/0123111 A1 * | 6/2004 | Makita et al. | 713/176 |
| 2007/0094724 A1 * | 4/2007 | Naedele | 726/22 |

FOREIGN PATENT DOCUMENTS

EP       1355476 A1 * 10/2003

* cited by examiner

*Primary Examiner* — Thanhnga B Truong
(74) *Attorney, Agent, or Firm* — Patent Capital Group

(57) ABSTRACT

A particular failed connection attempt initiated by a particular source asset in a network is identified and subsequent failed connection attempts initiated by the particular source asset in the network during a time period are tracked. A low frequency sequence of failed connection attempts involving the particular source asset is detected during the time period and the source asset is designated as a potential security risk based on the detected low frequency sequence of failed connection attempts.

23 Claims, 4 Drawing Sheets

STEALTH NETWORK ATTACK MONITORING

RELATED APPLICATIONS

This application is a continuation of U.S. patent application Ser. No. 13/095,525, filed on Apr. 27, 2011, entitled "STEALTH NETWORK ATTACK MONITORING."

BACKGROUND

This specification relates to network security.

A network is a system of computer assets in data communication. Many networks are private networks, e.g., a particular network may be an internet protocol based network that is logically independent from other internet protocol based networks. An enterprise network of a company that is connected to the Internet through a router and firewall is one example of such a private network.

One or more security provisioning systems can be used to protect each network from attacks by malicious software and users. For example, network security systems includes network sensors that are deployed on the edge of a protected network or within the network, and one or more network security servers in data communication with the network sensors. The sensors detect new assets attempting to gain access to the network and monitor assets that have been granted access to the network. The sensors report to the network security server(s) when new assets are attempting to gain access to the network, and report actions taken by the assets that are attempting to join the network or that are already on the network. The sensors can take actions with respect to an asset immediately, or can take actions with respect to the asset as determined by the network security server(s), depending upon a number of security related factors.

Often an attack on a network is preceded by, or begins with, a series of probes on the network. For example, an attacking device, such as malicious software or a bot, may attempt to connect to multiple different ports in a network to discover services. Multiple ports may exist on a particular host, and multiple hosts may serve a particular port. Accordingly, such probing actions are often burst-like in nature.

Current algorithms for probing detection rely on detecting N connection attempts (whether successful or not) in M seconds from a particular asset. The asset may be internal to the network, or may be an external asset that is attempting to or has gained access to the network. These algorithms work well for fast, noisy scanners. To avoid keeping too many tracking instantiations in the system, the duration M is usually in the order of seconds of minutes so that the security monitoring system does not need to track all sources for long periods of time (e.g., hours or even days). Another reason for maintaining an aggressive N/M ratio (i.e., high N, low M) is the sheer volume of "true positives" from fast-scans in many environments.

Thus, given the burst-like nature of the probing action, the relatively brief tracking time duration accomplishes dual goals—providing a time window that is long enough to detect probing attacks from an asset, and limiting the amount of memory and processing resources required to protect the network.

However, if the scanning by an attacking asset is intentionally slowed down to stealth levels (e.g., 3-4 probes over several hours), N/M thresholds for current scan detection algorithms are not triggered. For example, an unauthorized user may gain access to an asset on a company premises, and may manually seek out services on various ports for exploitation. The user, however, may issue the requests in a stealth manner, e.g., one or two requests every several hours. Likewise, a malicious agent may be installed on an asset and systematically seek out services on various ports for exploitation. The agent, however, may be programmed to issue the requests in the same stealth manner.

SUMMARY

In general, one innovative aspect of the subject matter described in this specification can be embodied in methods that include the actions of monitoring a network for failed connection attempts in the network, wherein the network is an internet protocol based network that is logically independent from other internet protocol networks, and each failed internal connection attempt is initiated by a source asset in the network and is an attempt to connect to a destination asset in the network; and only in response to detecting a failed connection attempt initiated by a source asset: instantiating a source asset tracking instance in a computer memory, the source asset tracking instant identifying the source asset and being associated with the source asset; for each source asset tracking instance in the computer memory: monitoring the source asset identified by the source asset tracking instance for a threshold number of failed connection attempts to destination assets in the network during a time period for the source asset tracking instance; and in response to detecting the threshold number of failed connection attempts from the source asset during the time period for the source asset tracking instance, designating the source asset as a security risk. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. By limiting a failed connection request threshold to a relatively low number, e.g., five probes from a particular asset during a day, the method detects both stealth and noisy probing attacks, thereby extending the capabilities of existing noisy detection algorithms. Additionally, detection of low-frequency stealth attacks and false negatives are reduced. Denying instantiation of a source asset tracking instance when resource allocation limits are approached allows for the maintaining of existing instantiations of source asset tracking instances, thereby balancing resource requirements (e.g., memory requirements) against false negative detections. Selectively monitoring for only certain types of failed connection attempts, and ignoring all other types of failed connection attempts facilitates further reductions in resource allocation requirements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 Overview

This written description describes systems and methods for detecting stealth attacks. As used herein, stealth attacks are a series of actions that have a relative low N/M ratio with respect to the ratio of a burst-like attack with a high N/M ratio. For example, a burst-like attack may have a minimum ratio of 10/1, where 1 is a unit time period (e.g., 1 second), and 10 is the quantity of monitored events during the unit time period. Conversely, a stealth attack may have a relatively low ratio of 1/3600, e.g., 1 monitored event per hour. A stealth attack is thus a series of actions that are spaced apart in time in a manner to avoid detection by monitoring software that is designed to detect high N/M ratio attacks or probes.

Figure 1:
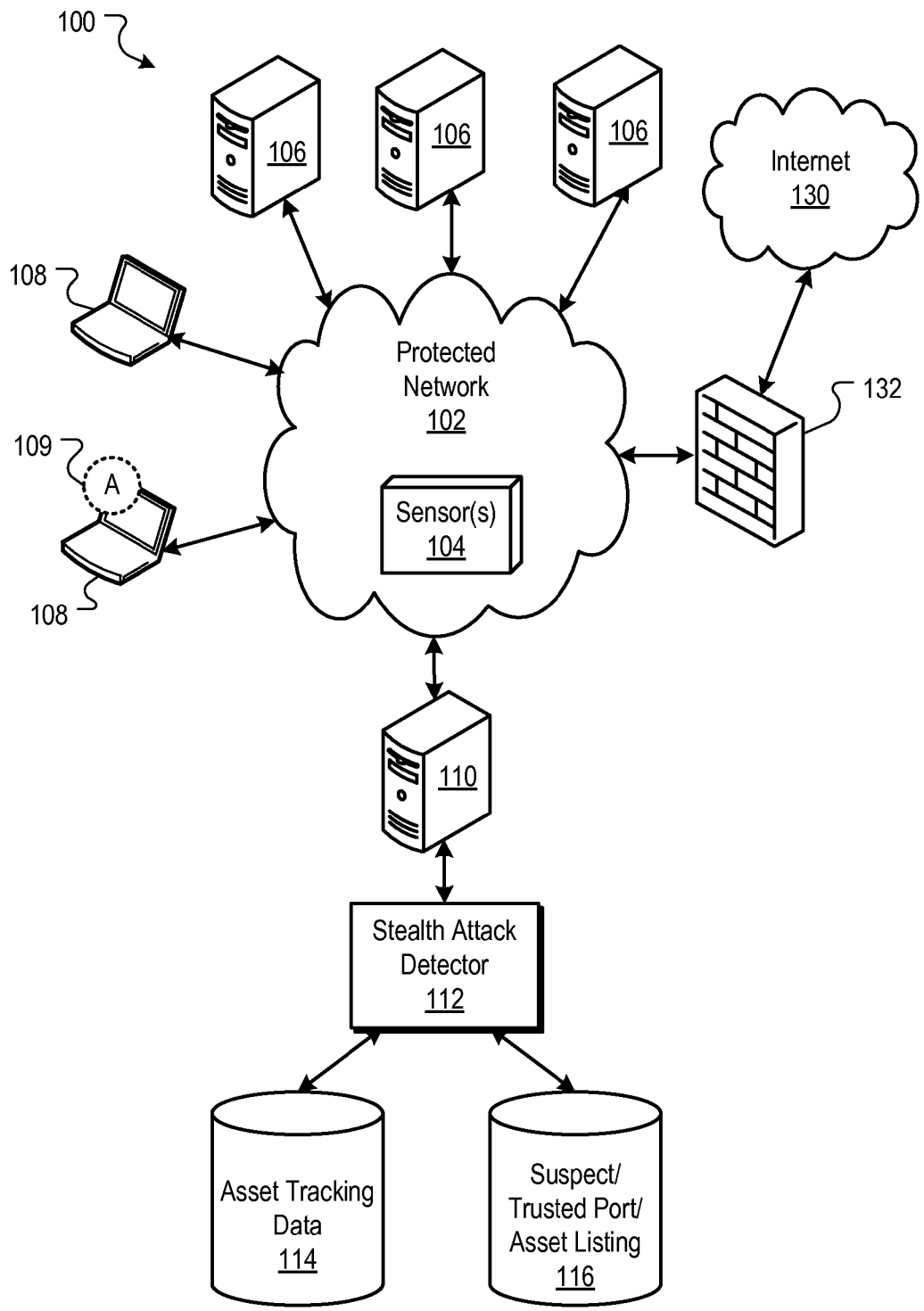
FIG. 1 is a diagram of an example network in which stealth attack detector is used to detect stealth attacks.

FIG. 1 is a diagram of an example network 100 in which stealth attack detector 112 is used to detect stealth attacks. A protected network 102, e.g., an enterprise network, is connected to an outside network 130 (e.g., the Internet), through a router implementing a firewall 132, and optionally other security protections. Computer assets, such servers 106, clients 108, and a data processing apparatus 110 communicate over the protected network 102. The data processing apparatus 110 includes one or more security servers used to provide one or more security services to protect the network 102 from threats. These threats include, for example, viruses, malware, and attacks. Each asset can be protected by a variety of countermeasures, one of which includes stealth attack detections by a stealth attack detector 112, which will be described in more detail below.

The assets are monitored by network based sensors 104. In some implementations, the network-based sensors 104 are hardware devices and/or software processes in a data communication path between assets protected by the sensor and the network resources that the asset is attempting to access. An example network-based sensor 104 includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a data processing apparatus 110 and take further actions as instructed by a response to the query.

When an asset tries to send information through the network 102 or receive information over the network 102 through a network-based sensor 104, the sensor analyzes information about the asset and the information being sent or received and generates data about the information. In some implementations, the network based sensor 104 can also determine whether to allow the communication.

2.0 Stealth Detection

The data processing apparatus 110 can provide a variety security services, including stealth attack detection by executing stealth attack detector 112 software. In some implementations, the stealth attack detector 112 is designed to focus on a particular network that is logically independent from other networks. The network 102 is one example of such a network, e.g., an enterprise network where the entire network is typically on a private address space behind a network address translation (NAT) device (e.g., a router). Each asset on the network 102 not accessible from outside the enterprise, and thus fast, burst-like scans tend to be rare, as such burst-like attacks typically originate from outside sources that have gained access to the network. Accordingly, only traffic internal within the private address range of the network (e.g., traffic originating from a source asset on the network to a destination asset on the network, such as within the address ranges of 172.16.X.X, 192.168.X.X, or 10.X.X.X, wherein each value of X ranges from 0-255, or such as within other address ranges that are used internally and are defined as private address ranges by system administrators) is monitored by the stealth attack detector 112. Of course, other security processes can still be used to track and detect noisy, burst-like scanning events as well.

The stealth attack detector 112 is designed on the premise that the attacker, no matter how stealth, does not have knowledge of an internal enterprise network. As part of the recon process, the attacker will attempt to connect to ports that are not running any service, due to the attacker's ignorance of the network. Thus, if a particular source asset being used by an attacker attempts to connect to even a few non-existent services in a day, the source asset is designated as a security risk.

For example, assume one of the clients 108 is being used by an attacker 109. The attacker 109 could be a person, or could be a software agent. In either case, the attacker 109 does not have knowledge of the network 102. Accordingly, the attacker 109 may attempt, in a stealth manner, to discover particular hosts for ports and services. For example, that attacker may attempt to connect to an FTP service (port 21), an SSH service (port 22), an SMTP service (port 25), etc. The attacker 109, not having knowledge of the network 102, will likely issue connection requests that are denied, as the service the attacker 109 seeks may not be handled by particular hosts, or may not be present. These requests and responses are monitored by the sensor(s) 104, and the data are provided to the stealth attack detector 112.

Figure 2:
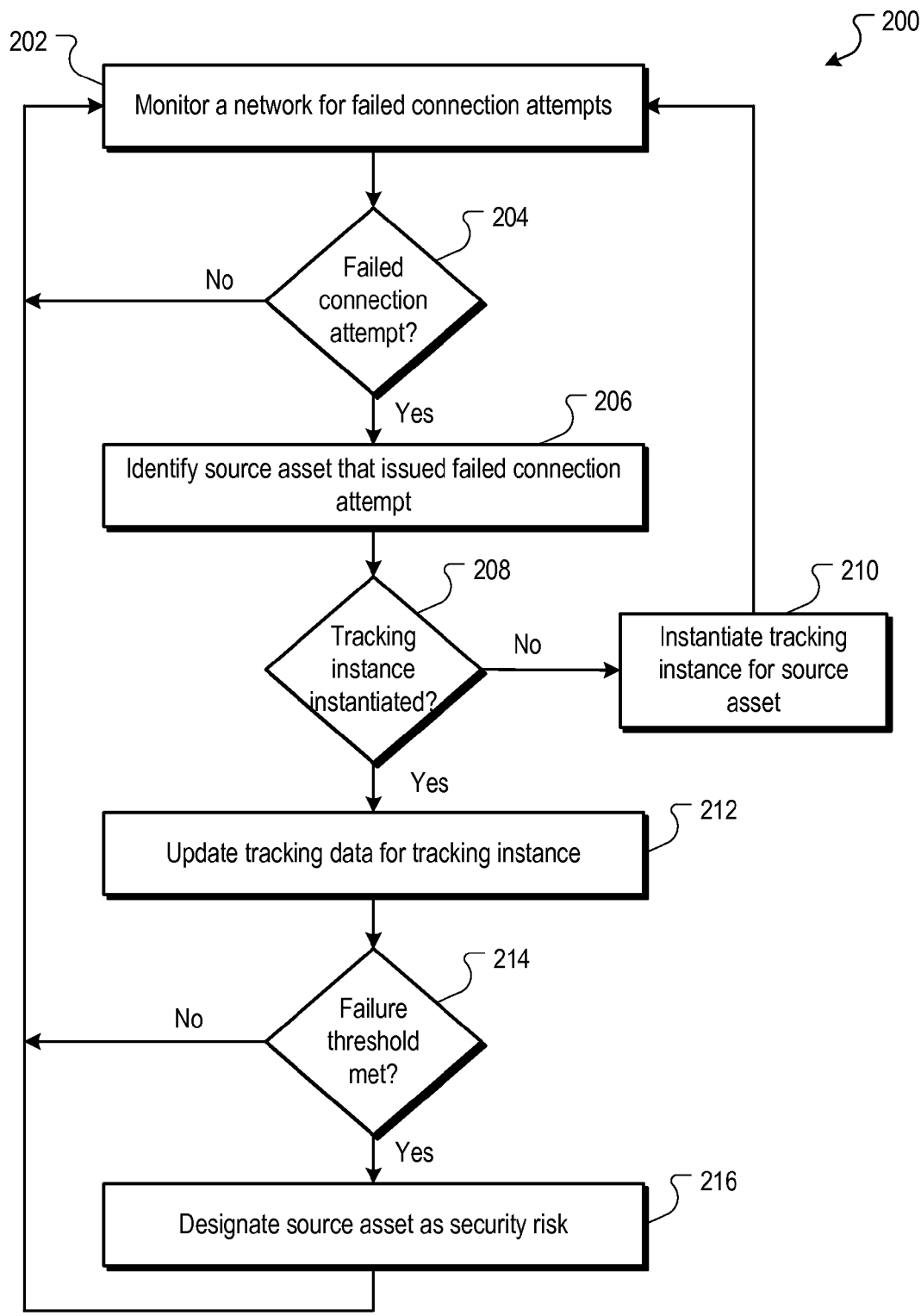
FIG. 2 is a flow chart of an example process for monitoring connection attempts and detecting stealth attacks.

An example process 200 for monitoring connection attempts and detecting stealth attacks is shown in FIG. 2, and is described below with reference to both FIGS. 1 and 2. The stealth attack detector 112 receives the data from the sensor(s) 104, and monitors the network for failed connection attempts (202).

If the stealth attack detector 112 monitors a failed connection attempt (204), then the stealth attack detector 112 identifies a source asset that issued the failed connection attempt (206). In some implementations, the tracking of an asset is only initiated on the detection of a failed connection attempt, as a failed connection attempt may be a manifestation of malicious activity, and thus is indicative of a suspicious source asset. A suspicious source asset is an asset that issues a connection request that causes a failed connection attempt; an asset is not monitored in response to issuing a connection request that results in success. For example, for TCP, the system monitors for RSTs or timeouts while waiting for acknowledgments of synchronization requests. Likewise, for UDP, the system monitors for ICMP unreachable errors.

By monitoring only source assets that issue connection requests that cause failed connection attempts instead of monitoring all assets, the number of assets that are tracked for a corresponding time duration is significantly reduced. Accordingly, the memory resources that are required to store such tracking data are also reduced.

The stealth attack detector 112 determines if a tracking instance for the source asset has been instantiated in computer memory (208). A tracking instance is an instantiation of a data structure object that identifies the source asset and is associated with the source asset. Tracking instances are stored in asset tracking data 114. Each source asset being tracked has a corresponding tracking instance stored in the asset tracking data 114. The tracking instance also stores additional information, such as the time the instance was created, and details regarding the failed connection attempt(s), such as the times and types of failed connections.

If a tracking instance has not been instantiated, then the stealth attack detector 112 instantiates a tracking instance for the source asset (210). The tracking instance that is instantiated identifies the source asset, the failed connection request, and the time of the failed connection request.

If a tracking instance has been instantiated, then stealth attack detector 112 updates the tracking data for the tracking instance (212). The update includes, for example, data describing the most recent failed connection request and the time of the failed request. After updating the data for the tracking instance, the stealth attack detector 112 determines if a failure threshold for the source asset has been met (214). The determination is based on the updated tracking data for the source asset. A failure threshold is met if the source asset has caused a threshold number of failed connection attempts to destination assets in the network during a time period. The time period can, for example, be measured relative to the first failed connection event. Other time periods can also be used. For example, the time period can dependent on the status of a user of the asset. Thus, an asset that is configured for guest access (e.g., a client computer in a contractor's office, or a client computer in a visiting employee office) can have a longer time period that a client that is configured for access by a full time employee.

If the threshold for the source asset has been met, the stealth attack detector 112 designates the source asset as a security risk (216). In response to the designation, one or more security system may take one or more security measure with respect to the source asset, e.g., quarantining the source asset from the network, precluding access to the source asset, etc.

3.0 Resource Management

To further reduce the resource requirements, in some implementations the stealth attack detector 112 monitors only connection requests to specific ports. Connection requests for ports for services that rely on being discovered (e.g., ports for printer services) are ignored. While connection requests to discover services that rely on being discovered may be denied, resulting in a failed connection attempt, such a failed connection attempt is not indicative of a potentially malicious agent or user. This is because a trusted process that has been determined to not be a suspect or unknown process (e.g., a printer discovery process that initiates when a client joins a network) caused the failed connection request. Such ports for services that rely on being discovered are considered trusted ports, and thus port connection attempts to such ports may be ignored for security monitoring.

Conversely, suspect ports are ports that are determined to be commonly scanned by suspect or unknown processes. Suspect ports may be dependent on the communication protocol being used. Table 1 below provides an example of suspect ports for particular services and protocols:

TABLE 1

| Port | Service | Protocol |
|---|---|---|
| 21 | ftp | ftp, tcp |
| 22 | ssh | tcp |
| 23 | telnet | tcp |

TABLE 1-continued

| Port | Service | Protocol |
|---|---|---|
| 25 | Smtp | Tcp |
| 53 | Dns | Tcp, udp |
| 80 | http | Tcp |
| 110 | Pop3 | Tcp |
| 143 | Imap | Tcp |
| 443 | https | Tcp |
| 1433 | Mssql (TDS) | tcp |
| 1434 | Mssql (SSRS) | udp |
| 2638 | Mssql (TDS) | tcp |
| 3306 | Mysql | Tcp |
| 1521 | Oracle | Tcp |
| 139 | Netbios-ss | Tcp |
| 445 | Netbios-ss | Tcp |
| 137 | Netbios-ns | Udp |
| 138 | Netbios-dg | Tcp, udp |

More or fewer types of port requests can be monitored. Data defining which requests for ports are to be monitored (and, optionally, which are to be ignored) can be stored in suspect and trusted port listing data 116.

In some implementations, assets that are detected by other processes as being security risks can be precluded from being tracked by the stealth attack detector 112, or, if currently being tracked, the stealth attack detector 112 is configured to stop tracking the asset. As the asset is determined to be a risk by another security process, one or more security measures will be taken with respect to the asset. Accordingly, the stealth attack detector 112 need not be required to track the asset until the asset is evaluated as "healthy" after the security measures are taken. For example, if an asset is determined to be infected following a virus scan, or if the asset is detected as exhibiting a burst-like attack by a high N/M scanner, the asset is determined to be a risk, and the stealth attack detector 112 need not track the asset.

In some implementations, some assets may be identified as trusted assets (e.g., a list of trusted assets according to their IP addresses), and the stealth attack detector 112 does not track these assets if the assets cause failed internal connection attempts. For example, an asset may be a security scanner that issue burst-like scans, or issue multiple denied connection requests in a stealth-like mode. This behavior may be part of a trusted security process, and thus, for the trusted asset, is not indicative of an infected asset. Accordingly, the stealth attack detector 112 ignores the trusted asset.

To manage memory resources, tracking instances are purged from memory if the source asset is identified as being a risk, or if the source asset does not issue a minimum number of failed connection attempts after a monitoring time period. In the case of the former, once the source asset is identified as a risk, other security systems are notified so that one or more security measures may be taken with respect to the source asset. Accordingly, further monitoring of the source asset by the stealth tracking detector 112 is not necessary. In the case of the latter, it is likely that the connection failure was not due to a stealth attack, and thus the source asset need not be monitored further. Should the asset issue a failed connection request at a time after its corresponding track instance is purged, the stealth tracking detector 112 will instantiate a new tracking instance for the asset.

Figure 3:
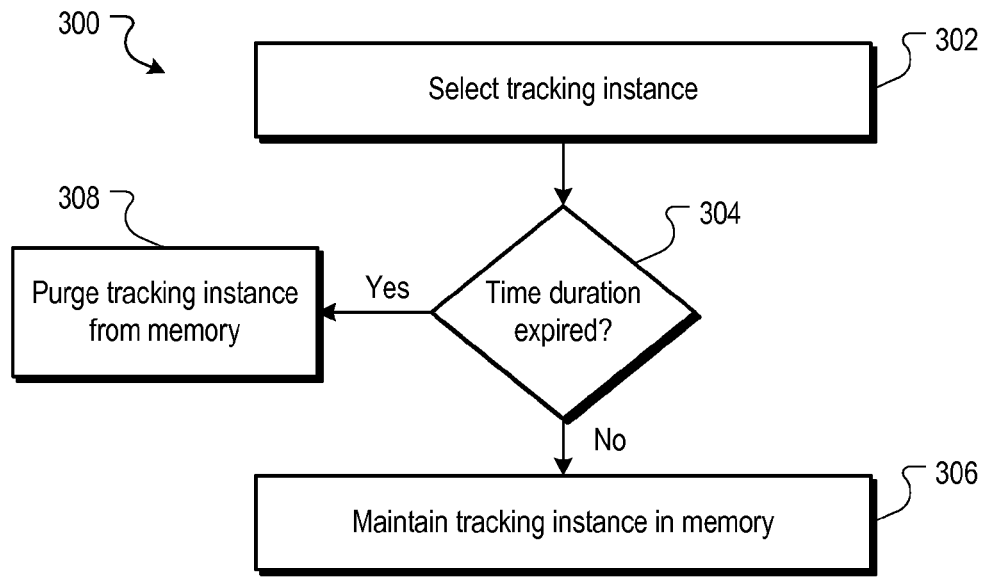
FIG. 3 is a flow chart of an example process for purging asset tracking instances from a computer memory.

FIG. 3 is a flow chart of an example process 300 for purging asset tracking instances from a computer memory. The process 300 can be implemented in the data processing apparatus 110 by the stealth attack detector 112.

The stealth attack detector 112 selects a tracking instance (302). For example, as part of a maintenance routine for the asset tracking data 114, the stealth attack detector 112 sequentially selects each tracking instance for analysis.

The stealth attack detector 112 determines if a time duration has expired (304). For example, if the difference between the current time and the time of the first failed connection attempt for the tracking instance is greater than time duration, the time duration has expired.

If the time duration has not expired, then the stealth attack detector maintains the tracking instance in memory (306). Conversely, if the time duration has expired, the stealth attack detector 112 purges the tracking instance from memory (308).

4.0 False Negative Management

In some implementations, if a resource capacity for monitoring suspicious source assets is reached, newly identify suspicious source assets are ignored. This avoids false negatives by preventing an attacker from forcing a purge of a currently monitored source asset by deliberately initiating attacks from other source assets.

Figure 4:
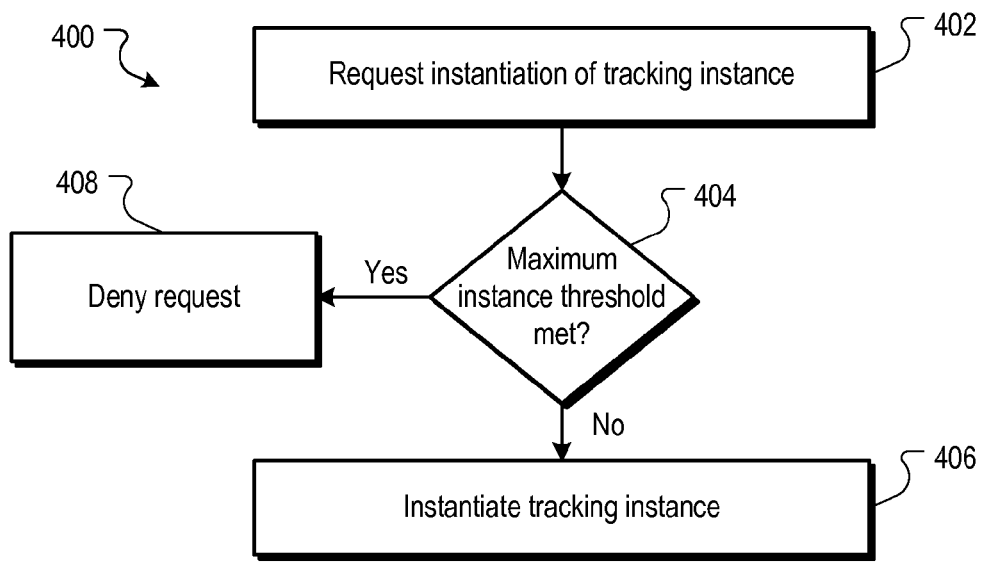
FIG. 4 is a flow chart of an example process for instantiating a tracking instance.

FIG. 4 is a flow chart of an example process 400 for instantiating a tracking instance. The process 400 can be implemented in the data processing apparatus 110 by the stealth attack detector 112.

The stealth attack detector 112 receives a request for instantiation of tracking instance (402). For example, a sub process in the stealth attack detector 112 may determine that a computer asset issue a connection requests to a suspect port and the connection request was denied.

The stealth attack detector 112 determines whether the maximum instant threshold is met (404). A maximum instant threshold is met when the resources allocated to tracking stealth attacks are nearly fully utilized. In some implementations, this determination may involve determining if an amount of computer memory currently being used to store data for source asset tracking instances meets a maximum allocation threshold. For example, if 95% of allocated computer memory is being used, no additional tracking instances will be instantiated. Accordingly, another source tracking instance is instantiated only if the amount of computer memory currently being used does not meet the maximum allocation threshold.

In another implementation, the determination may involve determining if a number of instantiated source asset tracking instances meets a maximum instantiation threshold. For example, if a maximum of 1000 tracking instances are allowed, and 1000 tracking instances have been instantiated, the new tracking instance will not be instantiated. Accordingly, another source tracking instance is instantiated only if the number of instantiated source asset tracking instances does not meet the maximum instantiation threshold.

The above are illustrative examples of how to determine whether a system is approaching or has reached full utilization of resource requirements, such as memory resource requirements. Other techniques to determine a level of utilization of resource requirements can also be used. Additionally, other factors can also be considered, such as processor utilization, data throughput, and other metrics that can be used to measure the resource utilization of a system.

If the maximum instant threshold is not met, then the stealth tracking detector 112 instantiates a tracking instance (406). Conversely, if a maximum instant threshold is met, the stealth attack detector 112 denies the request (408).

5.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Figure 5:
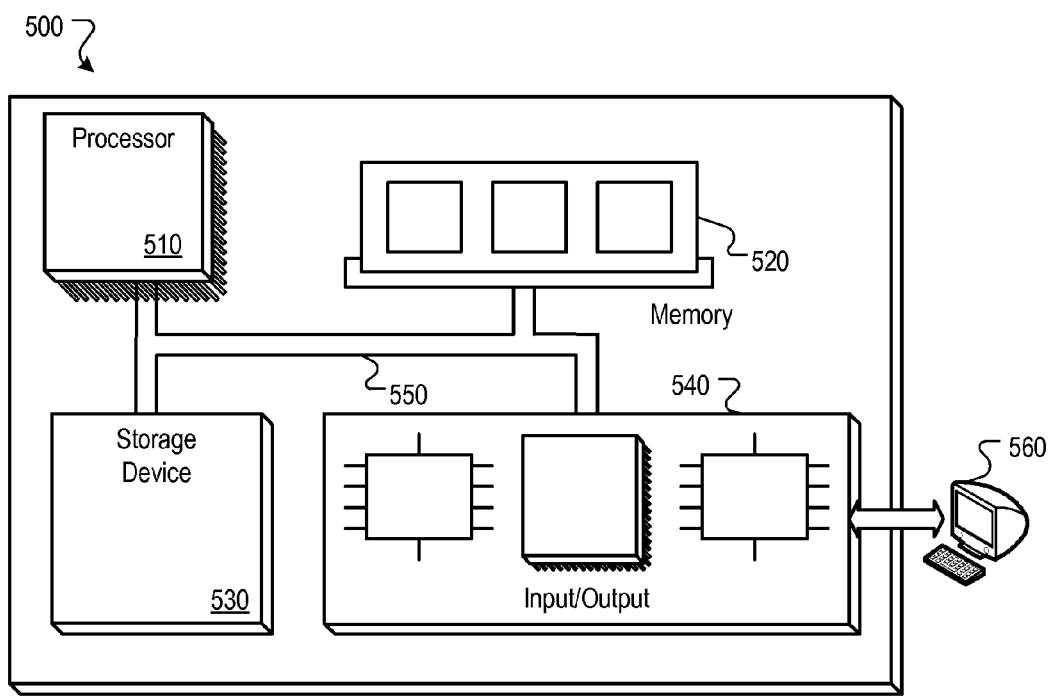
FIG. 5 is a block diagram of an example computer system that can be used to implement the processes and systems described with respect FIGS. 1-4 above.

One example computer system is shown in FIG. 5, which is a block diagram of an example computer system 500 that can be used to implement the processes and systems described with respect to FIGS. 1-4 above. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, a solid state drive, and/or other large capacity storage devices.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. At least one machine accessible storage medium having instructions stored thereon, the instructions when executed on a machine, cause the machine to: identify a particular failed connection attempt initiated by a particular source asset in a network; track subsequent failed connection attempts initiated by the particular source asset in the network during a time period; determine whether the subsequent failed connection attempts during the time period correspond to a low frequency failed connection attempt rate corresponding to an attempted stealth attack, wherein the stealth attack is characterized by a low frequency series of connection attempts; and designate the source asset as a potential security risk based on a determination that the subsequent failed connection attempts correspond to the low frequency failed connection attempt rate.

2. The storage medium of claim 1, wherein the low frequency failed connection attempt rate comprises a sequence of repeated failed network connection attempts by a source at a rate not exceeding one attempt per hour.

3. The storage medium of claim 1, wherein the instructions when executed on a machine, further cause the machine to monitor the network for failed connection attempts in a private address range of the network.

4. The storage medium of claim 3, wherein the network is an internet protocol (IP) network and the private address range comprises a range of IP addresses.

5. The storage medium of claim 3, wherein the instructions when executed on a machine, further cause the machine to ignore failed port connection attempts to ports that are designated as trusted ports.

6. The storage medium of claim 3, wherein the instructions when executed on a machine, further cause the machine to ignore failed port connection attempts for source assets that are designated as trusted assets.

7. The storage medium of claim 3, wherein the instructions when executed on a machine, cause the machine to only monitor failed port connection attempts to ports that are designated as suspect ports.

8. The storage medium of claim 7, wherein the suspect ports include one or more of an SSH port, HTTP port, telnet port, and SMTP port.

9. The storage medium of claim 1, wherein the instructions when executed on a machine, further cause the machine to receive data describing detection of the particular failed connection attempt.

10. The storage medium of claim 1, wherein each failed connection attempt comprises an attempt by the respective source asset to connect to a respective destination asset in the network.

11. The storage medium of claim 10, wherein the instructions when executed on a machine, further cause the machine to track the subsequent failed connection attempts by the particular source based on identification of the particular failed connection attempt.

12. The storage medium of claim 11, wherein the instructions when executed on a machine, further cause the machine to generate a source asset tracking instance for the particular source asset based on identification of the particular failed connection attempt, wherein the source asset tracking instance is used to track the subsequent failed connection attempts.

13. The storage medium of claim 12, wherein the source asset tracking instance is generated based on a determination that a source asset tracking instance is not yet maintained for the particular source asset.

14. A method comprising:
identifying a particular failed connection attempt initiated by a particular source asset in a network;
tracking subsequent failed connection attempts initiated by the particular source asset in the network during a time period;
determining that the subsequent failed connection attempts during the time period comprise a low frequency sequence of repeated failed connection attempts according to a low frequency failed connection attempt rate corresponding to an attempted stealth attack; and
designating the source asset as a potential security risk based on determining that the sequence of failed connection attempts correspond to the low frequency failed connection attempt rate.

15. The method of claim 14, further comprising maintaining a source asset tracking instance for each source asset associated with a failed connection attempt, wherein the source asset tracking instance identifies the corresponding source asset and is used in the tracking of subsequent failed connection attempts initiated by the particular source asset.

16. The method of claim 15, wherein the sequence of failed connection attempts involving the particular source asset is determined from information maintained in the source asset tracking instance of the particular source asset.

17. The method of claim 15, wherein source asset tracking instances are generated based on detected failed connection attempts involving the corresponding source asset.

18. The method of claim 15, further comprising:
determining from a particular source asset tracking instance for another source asset that failed connection attempts involving the particular source asset do not correspond to a security risk; and
purging the particular source asset tracking instance based upon determining that failed connection attempts involving the particular source asset do not correspond to a security risk.

19. The method of claim 14, wherein the time period is a period of time measured from the particular failed connection attempt.

20. The method of claim 14, further comprising determining whether the subsequent failed connection attempts during the time period correspond to a higher failed connection attempt ratio corresponding to a burst-like probing attack.

21. A system comprising:
a data processing apparatus;
a storage medium; and
attack detection logic, executable by the data processing apparatus to:
identify a particular failed connection attempt initiated by a particular source asset in a network;
track subsequent failed connection attempts initiated by the particular source asset in the network during a time period;
determine whether the subsequent failed connection attempts during the time period correspond to a low frequency failed connection attempt rate corresponding to a stealth attack, wherein the stealth attack is characterized by a low frequency sequence of connection attempts; and
designate the source asset as a potential security risk based on a determination that the subsequent failed connection attempts correspond to the low frequency failed connection attempt rate.

22. The system of claim 21, further comprising a plurality of source asset tracking instances stored in the storage medium, wherein each of the plurality of source asset tracking instances is to track respective failed connection attempts of a corresponding source asset in a plurality of source assets including the particular source asset.

23. The system of claim 22, comprising resource management logic, executable by the data processing apparatus to purge source asset tracking instances based on a determination that a current sequence of tracked failed connection attempts by a respective source asset does not correspond to a security risk.

* * * * *